United States Patent [19]
Fox et al.

[11] Patent Number: 5,900,277
[45] Date of Patent: *May 4, 1999

[54] METHOD OF CONTROLLING INFILTRATION OF COMPLEX-SHAPED CERAMIC-METAL COMPOSITE ARTICLES AND THE PRODUCTS PRODUCED THEREBY

[75] Inventors: Richard T. Fox; Chan Han; Aleksander J. Pyzik, all of Midland; Robert T. Nilsson, Coleman, all of Mich.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/762,467

[22] Filed: Dec. 9, 1996

[51] Int. Cl.[6] .................................. B05D 1/06; B05D 1/32
[52] U.S. Cl. .......................... 427/180; 427/199; 427/282; 427/294; 427/443.2; 164/97; 164/98
[58] Field of Search ...................... 427/475, 594, 427/199, 282, 287, 429, 443.2, 154, 156, 180, 431, 435, 294; 164/97–98

[56] References Cited

U.S. PATENT DOCUMENTS

| | | | |
|---|---|---|---|
| 3,718,441 | 2/1973 | Landingham | 29/182.1 |
| 4,630,665 | 12/1986 | Novak et al. | 164/97 |
| 4,935,055 | 6/1990 | Aghajanian et al. | 164/66.1 |
| 4,961,778 | 10/1990 | Pyzik et al. | |
| 5,000,245 | 3/1991 | White et al. | 164/97 |
| 5,141,819 | 8/1992 | Aghajanian et al. | 428/545 |
| 5,163,498 | 11/1992 | Kantner et al. | 164/97 |
| 5,277,989 | 1/1994 | Aghajanian et al. | 428/545 |
| 5,316,069 | 5/1994 | Aghajanian et al. | 164/97 |
| 5,482,778 | 1/1996 | Aghajanian et al. | 428/472 |
| 5,780,164 | 7/1998 | Pyzik et al. | |

FOREIGN PATENT DOCUMENTS

| | | | |
|---|---|---|---|
| 0 369 928 A1 | of 1990 | European Pat. Off. | C22C 1/09 |
| 0 370 940 A1 | of 1990 | European Pat. Off. | C22C 1/09 |

*Primary Examiner*—Shrive Beck
*Assistant Examiner*—Fred J. Parker

[57] ABSTRACT

A process for preparing complex-shaped, ceramic-metal composite articles, comprising:

a) contacting a non-wettable powder that is non-wetting to a metal to be used for infiltration with a shaped ceramic body to form a layer(s) of the non-wettable powder on one or more surface(s) of the shaped ceramic body wherein the shaped ceramic body has a region(s) where there is no layer of the non-wettable powder;

b) infiltrating the shaped ceramic body with the metal through the region(s) where there is no layer of the non-wettable powder such that a complex-shaped ceramic-metal composite comprising one or more metal phases and one or more ceramic phases is formed, wherein the article has substantially the net shape of the shaped ceramic body and the undesirable regions of excess metal on the surface and undesirable phases within the complex-shaped ceramic-metal composite article near the surface are located only in the region(s) where there is no layer of the non-wettable powder.

A complex-shaped ceramic-metal composite article with undesirable regions of excess metal and undesirable phases on the surface(s) of or within the article only where there is or was no layer of non-wettable powder.

The process of the invention allows the preparation of complex-shaped ceramic-metal composite articles with undesirable regions of excess metal and undesirable phases on the surface(s) of or within the article only in the regions where there is or was no layer of non-wettable powder. The process of the invention allows the preparation of a complex-shaped ceramic-metal composite article which requires little or no machining of the surface(s) to achieve a finished article. A complex-shaped ceramic-metal composite article is prepared which contains few undesirable regions of excess metal and undesirable phases.

19 Claims, No Drawings

METHOD OF CONTROLLING INFILTRATION OF COMPLEX-SHAPED CERAMIC-METAL COMPOSITE ARTICLES AND THE PRODUCTS PRODUCED THEREBY

BACKGROUND OF THE INVENTION

This invention relates to a process for controlling the infiltration of complex-shaped ceramic-metal composite articles and the products produced thereby.

Ceramics are typically known as low-density materials with high hardness and stiffness; however, their brittleness limits their usefulness. Furthermore, ceramics are typically formed by creating a densified compact that requires significant and expensive grinding to achieve a final shape due to the large amount of shrinkage that occurs during densification of the compact. Metals are typically non-brittle, non-breakable materials; however, they lack some of the desirable properties of the ceramics, such as high hardness and stiffness. Therefore, combining a ceramic with a metal can create a composite material that exhibits the properties of a ceramic and a metal.

Processes for making ceramic-metal composite articles using ceramic preforms are known to those skilled in the art. U.S. Pat. No. 5,308,422 discloses a process for making ceramic-metal composite articles involving forming layers of ceramic material, sintering the layers of ceramic material into a porous ceramic compact and then infiltrating the porous compact with a metal by immersing the porous body in a bath of molten metal. This process involves the uncontrolled infiltration of the metal into the ceramic compact which leads to increased finishing costs due to the regions of undesirable excess metal and phases formed on the surface (s) of the composite. An undesirable phase is a reaction phase of the chosen ceramic and metal which occurs at the infiltration interface. The reaction phase is chemically unstable or it can cause pullout damage to the surface of the infiltrated part upon machining. Pullout damage results from machining of the undesirable phase on the surface of the article with partial removal of the undesirable phase occurring which leads to pitting and defects in the surface of the article.

What is needed is a process for preparing complex-shaped ceramic-metal composite articles that require little or no finishing of the article after infiltration. What is needed is a process for controlling the infiltration of the metal into the ceramic body, such that the metal is restricted to certain regions within the article. What is needed is a process for preparing ceramic-metal composite article wherein the undesirable regions of excess metal and undesirable phases on the surface(s) are limited and controlled. What is needed is a ceramic-metal composite article wherein the undesirable regions of excess metal and undesirable phases on the surface(s) are limited and controlled.

SUMMARY OF THE INVENTION

The invention is a process for preparing complex-shaped ceramic-metal composite articles, comprising:
a) contacting a non-wettable powder that is non-wetting to a metal to be used for infiltration with a shaped ceramic body to form a layer(s) of the non-wettable powder on one or more surface(s) of the shaped ceramic body wherein the shaped ceramic body has a region(s) where there is no layer of the non-wettable powder;
b) infiltrating the shaped ceramic body with the metal through the region(s) where there is no layer of the non-wettable powder such that a complex-shaped ceramic-metal composite comprising one or more metal phases and one or more ceramic phases is formed, wherein the article has substantially the net shape of the shaped ceramic body and the undesirable regions of excess metal on the surface and undesirable phases within the complex-shaped ceramic-metal composite article near the surface are located only in the region(s) where there is no layer of the non-wettable powder.

The invention is also a complex-shaped ceramic-metal composite article with undesirable regions of excess metal and undesirable phases on the surface(s) of or within the article only where there is or was no layer of the non-wettable powder.

The process of the invention allows the preparation of complex-shaped ceramic-metal composite articles with undesirable regions of excess metal and undesirable phases on the surface(s) of or within the article only in the regions where there is or was no layer of non-wettable powder. The process of the invention allows the preparation of a complex-shaped ceramic-metal composite article which requires little or no machining of the surface(s) to achieve a finished article. A complex-shaped ceramic-metal composite article is prepared which contains few undesirable regions of excess metal and undesirable phases.

DETAILED DESCRIPTION OF THE INVENTION

The process of the invention is used to prepare ceramic-metal composite articles of complex shape comprising one or more metal phases and one or more ceramic phases. The ceramic and metal are chosen such that the metal will wet and infiltrate the ceramic to form a ceramic-metal composite of varying phases. Furthermore, the non-wettable powder is chosen to prevent unwanted interaction between the ceramic and metal. The non-wettable powder limits the point of interface between the metal and ceramic thereby preventing or limiting the formation of undesirable excess surface metal and phases. Therefore, the phases in the coated and reacted ceramic-metal system are controlled and desirable.

The complex-shaped ceramic-metal composite articles of the invention are articles with undesirable regions of excess metal and phases on the surface(s) of or within the article only in the areas where there is no layer of non-wettable powder. For example, if a shaped ceramic body is layered in non-wettable powder with a small part of the surface area unlayered, the infiltration of metal will occur through the unlayered portion. Once infiltration is finished, the unlayered portion of the surface will be the only part of the surface of the article to contain excess metal and undesirable phases. This greatly reduces the final machining and finishing costs since only the unlayered portion needs to be machined, versus a large fraction of the entire surface(s) of the article if conventional infiltration techniques are used. Also, a portion of the surface of the article may be unlayered and thus contain undesirable excess metal and phases but not need machining because that portion is not necessary to the usage of the article. Furthermore, by controlling infiltration and the areas of excess metal, undesirable phase formation can be controlled. By controlling undesirable phase formation, the stability of the phases is controlled along with machining costs. For example, in aluminum metal systems with carbon containing ceramics, uncontrolled infiltration leads to the formation of aluminum carbide and $Al_4BC$ at the aluminum-boron-carbide infiltration interface. Aluminum carbide on the surface of a ceramic-metal composite article will react with moisture in the atmosphere and cause corrosion of the surface of the article. Corrosion of the surface leads to an unfinished, rough surface which is undesirable for most applications. Furthermore, undesirable phases can be harder and more difficult to machine to a given smoothness than the surrounding desirable phases at the surface of an article. Therefore, when machining is performed on the article, the undesirable phases at surface of the article can break off and cause pullout damage leaving unwanted pits and craters in the surface of the machined article thus making the article unusable for its intended purpose.

The process can be used to prepare any shape article for which infiltration is desired. Preferably, the process is particularly effective to prepare thin ceramic-metal composite articles of complex shape. The complex-shaped ceramic-metal composite articles preferably comprise at least three phases. Preferably, each of the phases is present in an amount of at least about 2 volume percent based on the volume of the multi-phased ceramic-metal material. The ceramic-metal composite article preferably has a residual free metal content of about 2 volume percent or greater. The ceramic-metal composite article preferably has a residual free metal content of about 75 volume percent or less, more preferably about 50 volume percent or less, and even more preferably about 25 volume percent or less.

The process of the invention may be utilized to produce ceramic-metal composite articles in which the metal infiltrates and essentially fills the pores of the porous ceramic. Preferably, the ceramic-metal composite article has a theoretical density of about 85 percent or greater, more preferably about 98 percent or greater and most preferably about 99.5 percent or greater, wherein the theoretical density (in percent) is 100 times the ratio of the final measured part density over the theoretical density of the material with no porosity. The ceramic-metal composite articles preferably have an elastic modulus high enough to prevent or reduce warping, sagging, fluttering or resonating during handling and use. Preferably, the ceramic-metal composite article demonstrates an elastic modulus of about 100 GPa or greater, more preferably about 150 GPa or greater, and even more preferably about 200 GPa or greater.

The ceramic-metal composite articles of the invention preferably demonstrate flexure strength high enough to impart shock resistance and resistance to damage during handling and usage. The ceramic-metal composite articles of the invention preferably demonstrate a flexure strength of about 250 MPa or greater, more preferably about 350 MPa or greater, and even more preferably about 450 MPa or greater. If electrical conductivity is a desired property, the ceramic-metal composite articles of the invention preferably have a conductivity high enough to prevent a build-up of static electricity. Preferably, if high electrical conductivity is a desired property, the composite article of the invention demonstrates a resistivity of about $10^{-2}$ ohm-cm or less, more preferably about $10^{-4}$ and even more preferably about $10^{-5}$ ohm-cm or less.

The complex-shaped ceramic-metal composite articles of the invention are preferably computer disk drive components. Preferably, the articles are computer hard disks, E-blocks, actuators, sliders, load beams, support arms, actuator bearings, spacers, clamps, spindles, ball bearings, thrust bearings, journal bearings, base plates, housings or covers. More preferably the articles are E-block actuator components and computer hard disks.

The metals useful in this invention are selected based on their capability of chemically reacting or wetting with a chosen ceramic material at elevated temperatures such that the metal penetrates into the pores of the ceramic. Selected metals can be taken from Groups 2, 4, 5, 6, 8, 9, 10, 13 and 14 using the new notation of the Periodic Table as published in the *Handbook of Chemistry and Physics,* CRC Press, New York, N.Y. U.S.A. (1995-1996), and alloys thereof. Preferably, metals for use herein include silicon, magnesium, aluminum, titanium, vanadium, chromium, iron, copper, nickel, cobalt, tantalum, tungsten, molybdenum, zirconium, niobium or mixtures and alloys thereof. Aluminum and alloys thereof are preferred because they exhibit high toughness, good electrical conductivity and machinability and have good wettability with a chosen ceramic, such as boron carbide, for example. Aluminum is best employed as an alloy which provides improved stiffness relative to pure aluminum. Alloys of aluminum with one or more of Cu, Mg, Si, Mn, Cr, or Zn are preferred. Alloys such as Al—Cu, Al—Mg, Al—Si, Al—Mn—Mg and Al—Cu—Mg—Cr—Zn and mixtures thereof are more preferred. Examples of such alloys are 6061™ alloy, 7075™ alloy, and 1350™ alloy, all available from the Aluminum Company of America, Pittsburgh, Pa.

The ceramics useful in this invention are chosen based on their chemical reactivity with the chosen metal at elevated temperatures so as to increase the penetration of the metal into the pores of the ceramic. Preferable ceramics for use herein include borides, oxides, carbides, nitrides, suicides or mixtures and combinations thereof. Examples of combinations of ceramics include boron carbides, oxynitrides, oxycarbides and carbonitrides or combinations thereof. More preferred ceramics are boron carbides, silicon carbides, titanium diborides and silicon nitrides. Even more preferred ceramics are $B_4C$, $AlB_{12}$, $SiB_6$, $SiB_4$ or combinations thereof. A most preferred ceramic material is boron carbide, because it has a desirably low density and high stiffness, along with excellent wetting characteristics when in contact with a selected metal. The ceramic material may also be mixed with an organic binder material such as paraffin wax, stearic acid, or ethylene vinyl acetate to facilitate processing. The ceramic material used to form the shaped ceramic body is preferably in powder form and typically contains metal chemically bonded to the boron, oxygen, carbon, nitrogen or silicon of the ceramic. The powdered ceramics are preferably crystalline materials having grains that are about 0.1 micrometers ($0.1 \times 10^{-3}$ mm) or greater. The powdered ceramics are preferably crystalline materials having grains that are about 50 micrometers ($50 \times 10^{-3}$ mm) or less, more preferably about 10 micrometers ($5 \times 10^{-3}$ mm) or less, and even more preferably about 5 micrometer ($1 \times 10^{-3}$ mm) or less. The crystalline particles may be in the shape of equiaxed grains, rods, or platelets.

Examples of preferred ceramic-metal combinations for use in forming multi-phase ceramic-metal composite articles includes: $B_4C/Al$, $SiC/Al$, $TiB_2/Al$, $SiB_x/Al$, $SiC/Mg$, $SiC/Mg$-Al, $SiB_x/Ti$, $TiN/Al$, $TiC/Al$, $ZrB_2/Al$, $ZrC/Al$, $AlB_{12}/Al$, $AlB_{12}/Ti$, $TiN/Ti$, $TiC/Ti$, $TiB_2/B_4C/Al$, $SiC/TiB_2/Al$, $TiC/Mo/Co$, $ZrC/ZrB_2/Zr$, $TiB_2/Ni$, $TiB_2/Cu$, $TiC/Mo/Ni$, $SiC/Mo$, $TiB_2/TiC/Al$, $TiB_2/TiC/Ti$, $WC/Co$, and $WC/Co/Ni$. The use of the subscript "x" represents that the compound can have varying stoichiometry. More preferred ceramic-metal combinations include: $B_4C/Al$, $SiC/Al$, $SiB_6/Al$, $TiB_2/Al$ and $SiC/Mg$. Most preferably, the materials forming the complex-shaped ceramic-metal composite article of the present invention are chemically reactive systems such as aluminum-boron-carbide. In these chemically reactive systems, the metal component, after infiltration, can be depleted to form ceramic phases that modify article properties such as hardness and stiffness. The aluminum-boron-carbide composite material includes at least one boron-carbide-containing phase and at least one aluminum-containing phase. Additionally, the phases may be admixed with a filler ceramic. The filler provides material for the finished article that does not adversely affect the desired properties of the ceramic-metal composite article. Filler can be selected from the group consisting of borides, carbides, nitrides, oxides, suicides, and mixtures and combinations thereof. The filler ceramic is preferably employed in an amount from about 1 to about 50 volume percent, based on the volume of the multi-phase ceramic-based material.

The aluminum-boron-carbide composite article preferably includes the phases of $B_4C$, $AlB_{24}C_4$, $Al_{3-4}BC$, $AlB_2$, $AlB_{12}$, $AlB_{12}C_2$, $Al_4B_{1-3}C_4$ The most preferred material is a multi-phase material made of $B_4C$, Al, and at least three other ceramic phases, preferably, $AlB_{24}C$ are preferably surrounded by aluminum boride and aluminum-boron-carbide. In other words, the composite article has a continuous ceramic network of aluminum boron, boron carbide, and aluminum-boron-carbide.

The non-wettable powders useful in this invention are chosen based on their ability to coat the article and to prevent undesirable interaction between the chosen ceramic and the chosen metal. The non-wettable powder chosen depends upon the particular ceramic and metal system desired to be infiltrated. The non-wettable powder is chosen so as to be non-reactive and non-wettable to the chosen metal when the metal is infiltrated into the ceramic substrate. The non-wetting powder prevents the formation of undesirable excess metal and phases at the surface of the ceramic article where infiltration is not desired. However, the non-wetting powder does not prevent infiltration from occurring internally to the article once the metal is contacted with some uncoated point on the surface(s) of the ceramic substrate. Examples of systems of metals, ceramics and non-wettable powders are aluminum, boron-carbide and aluminum nitride, respectively and aluminum, boron-carbide and aluminum oxide respectively. Preferred non-wettable powders are nitrides, suicides, oxides and combinations thereof. More preferred non-wettable powders are aluminum nitride, boron nitride, aluminum oxide and combinations thereof. Most preferred non-wettable powders are aluminum nitride, aluminum oxide, and combinations thereof.

Preferably, the powder particles can be any broad distribution of sizes which permit the use of the powder as a non-wetting powder on the surface of a ceramic body. The size of the non-wettable powder particles is sufficient to prevent infiltration from occurring through the layer of powder particles on the surface of the ceramic substrate. Preferably, the non-wettable powder particles have a particle size of about 0.1 micrometers or greater, more preferably about 0.5 micrometer and even more preferably about 1 micrometer. Preferably, the non-wettable powder particle have a particle size of about 50 micrometers or less, more preferably about 25 micrometers or less and even more preferably about 5 micrometers or less.

The ceramic and metal used for the process of the invention depend upon the product desired. In any embodiment, the metal and ceramic must be selected so as to facilitate infiltration. Infiltration is the process by which a metal, upon melting, forms a solid-liquid interface with a ceramic, with the metal as the liquid and the ceramic as the solid, and the metal moves into the pores of the ceramic material by capillary action. The wetting contact angle, as defined by Young's Equation, at which infiltration occurs is preferably less than about 90 degrees, more preferably less than about 45 degrees, and most preferably less than about 30 degrees.

The process of the invention involves a series of steps to be performed in order to coat and infiltrate the shaped ceramic body to achieve a ceramic-metal composite article of complex shape comprising one or more metal and one or more ceramic.

The preparation of the ceramic body involves forming a selected ceramic into a desired article shape. This step can be accomplished by a variety of ceramic forming processes as discussed hereinafter. The first step of the process of the invention involves contacting the chosen non-wettable powder with one or more surface(s) of the shaped ceramic body. The non-wettable powder can be contacted with the shaped ceramic body by any means which results in the formation of a layer of the non-wettable powder on one or more surface(s) of the shaped ceramic body where it is desired to not have excess metal deposited. Once the non-wettable powder is contacted with the shaped ceramic body, the next step involves infiltrating the metal in the ceramic of the shaped ceramic body through a process of heating the metal until it is molten, wherein the metal selectively penetrates the uncoated pores of the ceramic. The metal is infiltrated into the shaped ceramic body where the non-wettable powder was not layered onto the body. If desired, after infiltration, a heat treatment may be performed to impart certain other mechanical properties to the final complex-shaped ceramic-metal composite article.

In preparing the ceramic body, the selected ceramic is formed into the near net finished article shape. Any green ceramic-forming process or processes may be used which allows the formation of complex-shaped parts at or near net size and shape. Such ceramic-forming processes are well known in the art, for example, injection molding, slip casting, tape casting, gel casting, pressure slip casting, green machining, extrusion and roll compaction. *Modern Ceramic Engineering Properties, Processing and Use in Design*, D. W. Richerson and Marcel Dekker, Inc., N.Y. 1982. Preferred ceramic-forming processes include injection molding, tape casting and green machining. The first step of the process of the invention involves contacting the non-wettable powder with the shaped ceramic body in order to form a layer of the non-wettable powder on one or more surface(s) of the shaped ceramic body. The non-wettable powder can be contacted with the shaped ceramic body by any means which results in the formation of a layer of the non-wettable powder on one or more surface(s) of the shaped metal body such as thermal spraying (e.g. plasma spraying), atomized liquid spraying, dipping, spinning, brushing, rolling, padding, screening (e.g. screen printing), sol gel coating, electrostatic spraying, electrophoretic depositing, casting (e.g. tape casting) and combinations thereof. See, for example, *Principles of Ceramic Processing*, James Reed, 1988 or *Handbook of Tribology. Materials, Coatings, and Surface Treatments*, supra, relevant parts of each incorporated herein by reference. The layer can be a continuous layer, or a layer can be deposited in a pattern on the ceramic body. Patterns may be formed by a screen printing or a masking technique. More than one non-wettable powder can be used at the same time. Multiple layers of the non-wettable powders can also be used. Furthermore, a combination of non-wettable powders with powders that are wettable by the chosen metal can be used.

Preferably, the non-wettable powder is blended with a solvent into a slurry mixture in order to improve its ability to be contacted with the surface(s) of the shaped ceramic body. This can be accomplished by any conventional technique, such as wet milling. The non-wettable powder slurry comprises the non-wettable powder, a liquid solvent and optionally one or more of a binder, plasticizer and dispersant. Preferable solvents are water, alcohols and hydrocarbons. The binder can be any binder which binds the various materials together in the slurry mixture. Preferable binders are wax, resin, gums, polyethylene, latex, acrylics, lanolin, polypropylene, polystyrene, and other thermoplastic polymers. The plasticizer can be any plasticizer which facilitates processing of the slurry mixture. Preferable plasticizers are glycols, low molecular weight polymers (e.g., liquid at room temperature), oils, fats, and soaps. The dispersant can be any dispersant which promotes dispersion of the non-wettable powder and other materials in the slurry mixture. Preferably, for the dispersant to function efficiently, one portion of the dispersant needs to be adsorbed on to the particle surface while the other portion is stretched into the solvent. Generally, the strong adsorption is achieved by acid-based interaction between particle surface and the dispersant. Cationic dispersants, such as amines, are preferred for the negative particle surface and anionic dispersant, such as carboxylic acids, for positive particle surfaces. Dispersants useful in this invention are nonionic dispersants such as ethoxylated nonylphenol, anionic dispersants such as magnesium stearate, cationic dispersants such as dodecylamine hydrochloride and ampholytic dispersants such as dodecyl betaine. After milling the non-wetting slurry, it is heated, filtered and de-aired to remove bubbles and agglomerates. The non-wetting slurry is then contacted with one or more surface(s) of the shaped ceramic body.

Preferably, the non-wettable powder can be contacted with the shaped ceramic body using dipping, spraying or brushing. Spraying typically involves using an atomizer with a spray chamber having an inert atmosphere or in air. After the non-wettable powder slurry previously described is atomized during the spray deposition process, it is evenly deposited on one or more surface(s) of the shaped ceramic body. Spraying involves the controlled atomization of a slurry and the directed flow of the atomized droplets onto one or more surface(s) of the shaped ceramic body. On impact with the surface(s) of the shaped ceramic body, the droplets deform and coalesce into a thick layer. The slurry is dried slowly to prevent cracking of the non-wetting layer, and the drying temperature is controlled below the flash point of the chosen solvent system. The time of drying varies depending upon the solvent used and the thickness of the layer of the non-wettable powder on the shaped ceramic body. It may be necessary to debinder the non-wettable powder material, which can be done by any conventional debindering technique, for example, by heating under a vacuum or in an inert atmosphere.

The layer thickness generally is any thickness which is sufficient to provide a uniform layer on the surface(s) of the shaped ceramic body such that a complete contacting between the non-wettable powder and the selected ceramic is achieved. The layer thickness is dependent on the amount of non-wettable powder and layer porosity. The thickness of the sprayed layer is dependent on the spray geometry, solids content of the slurry, working distance, spraying time or sequence, rebound loss, and film flow. Spraying generally results in uniformity of the layering of the non-wettable powder upon the ceramic. The preferred layer thickness is about 1 particle diameter or greater, more preferably about 10 particle diameters or greater, and even more preferably about 25 particle diameters or greater. The preferred layer thickness is about 0.01 mm or greater. The preferred layer thickness is about 2 mm or less, more preferably about 1 mm or less and even more preferably about 0.25 mm or less.

If desired, the use of screen printing could also be used to impart some geometry or texturing of the non-wettable powder layer on the surface(s) of the shaped ceramic body, thus further defining the geometry of the composite body. A printing screen is utilized to impart the desired ceramic pattern upon the shaped ceramic body during screen printing and the printed image is dried. Screen printing processes are further described in greater detail in Kosloff, *Screen Printing Techniques*, Signs of the Times Publishing Co., Cincinnati, Ohio, 1981, relevant parts incorporated herein by reference.

The next step in the process involves infiltrating the shaped ceramic body with the chosen metal such that a shaped ceramic-metal composite article is formed. Infiltration is the process by which a metal, upon melting, forms a solid-liquid interface with a ceramic, with the metal as the liquid and the ceramic as the solid, and the metal moves into the pores of the ceramic material by capillary action. This process preferably forms a fully dense ceramic-metal composite material. The infiltration of the metal into the ceramic occurs through the portions of the surface(s) of the shaped ceramic body where the non-wettable powder was not applied. Infiltration can be performed by any method that is known in the industry, for example, U.S. Pat. Nos. 4,702,770 and 4,834,938, both incorporated herein by reference. There are many well-known ways of infiltrating a metal into a ceramic body. Preferred methods of infiltration are heat infiltration, vacuum infiltration, pressure infiltration, and gravity/heat infiltration. When the infiltration is performed, the metal wets and permeates the pores of the ceramic that is in contact with the shaped metal body. The degree of wetting measured by the contact angle between the metal and the ceramic may be controlled by selecting temperature and time of infiltration. The temperature of infiltration is dependent upon the chosen metal. Infiltration is preferably performed at a temperature such that the metal is molten but below the temperature at which the metal rapidly evaporates. The preferred temperature for infiltration of the selected metal into the selected ceramic depends on the melting temperature of the selected metal. For aluminum, the preferred temperature for infiltration of the selected metal into the selected ceramic is about 1200° C. or less and more preferably from about 1100° C. or less. For example, the preferred temperature for infiltration of aluminum into a ceramic is from about 750° C. or greater and more preferably about 900° C. or greater.

For each metal, exact temperature and time of infiltration can be established by contact angle measurements to determine when wetting conditions are achieved. Infiltration time is dependent on several factors, such as packing density, pore radius, void ratio, contact angle, viscosity, surface tension and sample size. Infiltration is preferably performed until the metal-infiltrated ceramic material is substantially dense. Preferably, the infiltration time for a metal selected from the preferred class of metals and a ceramic selected from the preferred class of ceramics is about 0.1 hour or greater, more preferably about 0.5 hour or greater, and even more preferably about 1 hour or greater. Preferably, the infiltration time for a metal selected from the preferred class of metals and a ceramic selected from the preferred class of ceramics is about 24 hours or less, more preferably about 12 hours or less, and even more preferably about 6 hours or less. For example, the preferred time for infiltration of aluminum into a 1 mm thick layer of boron carbide at 1100° C. is about 10 minutes. Infiltration can be accomplished at atmospheric pressure, subatmospheric pressures or superatmospheric pressures. The infiltration is preferably performed in an inert gas, such as argon or nitrogen, or under vacuum. At superatmospheric pressure, the infiltration temperature can be lowered. Infiltration is preferably performed until the ceramic-metal composite article is densified to greater than about 85 percent theoretical density, more preferably greater than about 98 percent theoretical density, and most preferably to greater than 99.5 percent theoretical density. Upon completion of the infiltration step, a fully infiltrated, complex-shaped ceramic-metal composite article is formed.

After infiltration, heat treatment may be optionally performed on the ceramic-metal composite article in order to further tailor mechanical properties of the article. A preferred method of altering the microstructure of already infiltrated ceramic-metal composite articles involves post-infiltration heat treatments of the previously infiltrated composite articles. The mechanical properties that can be tailored include fracture toughness, fracture strength, and hardness. This additional step of heating the ceramic-metal composite article at a selected temperature for a selected amount of time will decrease the amount of residual free metal and improve the uniformity of the multiphase ceramic-based material. As a result of the post-infiltration heat treatment, a slow growth of ceramic phases takes place. It is during this heat treatment that the greatest control over the formation of multi-phases and the above-stated mechanical properties in the ceramic-metal composite article is achieved. The temperature at which the heat treatment is performed is a temperature at which the residual free metal will decrease. Furthermore, the temperature at which the heat treatment is performed is the lowest temperature at which chemical reactions in the solid state are taking place. A preferred method of altering the microstiucture of already infiltrated ceramic-metal composite articles involves post-heat treatments of already infiltrated composite articles at about 650° C. or greater, more preferably about 700° C. or greater. The maximum temperature for post-heat treatment is the melting point of the metal in the ceramic-metal composite article. The time of heat treatment is preferably long enough that the desired properties in the ceramic-metal composite article are achieved by altering the microstructure.

For example, in the case of aluminum-boron-carbide, this additional step of heat treating is preferably accomplished by heating the infiltrated body to a temperature of about 660° C. or greater, more preferably about 700° C. or greater and even more preferably about 800° C. or greater. Preferably, the heat treatment is accomplished at a temperature of about 1500° C. or less, more preferably at about 1200° C. or less and even more preferably about 1000° C. or less. The preferable time period for the heat treatment of aluminum-boron-carbide is from about 1 hour or greater, more preferably about 25 hours or greater. The heat treatment may be performed in air or an inert atmosphere such as nitrogen or argon. Preferably, the heat treatment is performed in air.

After infiltration and optional heat treatment, the infiltrated body is cooled. Optionally, the infiltrated body may be machined and polished into a final desired shape. Any undesirable excess metal on the surface(s) not treated with non-wettable powder may be machined or polished to remove the metal. It may be desirable to polish the infiltrated article depending upon the end usage for the infiltrated article. For example, if the desired article is a computer hard disk, the surface(s) of the disk should be polished to a substantially uniform average roughness value of between about 1 and about 2000 Å.

Either after infiltration or the optional heat treatment step, the non-wettable powder may be removed from the surface (s) of the article. Removal of the non-wettable powder may be performed by any method known to one skilled in the art. Examples of methods of removal include sonication in water or other solvents or mechanical scrubbing. Preferably, the method of removal is by sonication in water.

Also, for example, if the desired article is a computer disk, a coating may be applied to the disk in order to impart texture to the surface(s) of the composite article. A suitable coating, for example, is a nickel-phosphorus coating; however, other types of coatings can be used such as, for example, metals and polymers. If a nickel-phosphorus coating is used on an article such as a computer hard disk, the current industry procedures for manufacturing and utilizing disks may be used. The coating method may be any that provides dense coating, such as atomic deposition, particulate deposition, bulk coating, or surface modification. The most typical method of coating is electroplating. The coating itself may be further treated to provide a textured surface either over the entire surface or a portion of the surface. The further treatment may be accomplished by techniques such as mechanical techniques, chemical or optical techniques, electrical techniques, or a combination thereof.

The process for preparing the complex-shaped ceramic-metal composite articles allows the creation of complex-shaped ceramic-metal composite articles with little or no undesirable excess metal on the external surface(s) of the article after infiltration so that any article where net shape is desirable through forming of the shaped ceramic body and subsequent controlled infiltration may be formed through this process. Preferred products of this invention are computer hard disks and hard disk drive components, wherein the material has a high hardness, a high wear resistance, a high fracture toughness, a high damping capability, a low density, and a high specific stiffness and is electrically conductive. There are many other applications for complex-shaped ceramic metal composite articles such as pressure housings, automotive engine parts, brake systems or any part that requires infiltration.

SPECIFIC EMBODIMENTS

The following are included for illustrative purposes only and are not intended to limit the scope of the claims.

EXAMPLE 1

A boron carbide ($B_4C$) greenware part is prepared through mixing 328.4 grams of ESK F1500 $B_4C$ powder with 114.78 grams of an organic binder, a plasticizer and a dispersant. These components were mixed at 60 rpm/130° C. in a 260 mL bowl attached to a Haake Rheocord System 40 torque rheometer, resulting in a mixture with a solid volume content of 50.1 percent. This formulation was injection molded into a shape occupying approximately 9.1 cm³, at a barrel temperature of about 93.3° C., and an injection rate of approximately 60.1 cm³/sec. The part was debindered according to the following approximate heating schedule: 7° C./hr-310° C., 10° C./hr-375° C., 20° C/hr-430° C., 7° C./hr-500° C., 30° C./hr-530° C., and cool to room temperature in a nitrogen atmosphere utilizing an alumina (Alcoa A-16 SG) powder bed.

The part was then spray coated with a 10 v/o Aluminum nitride/ 90 v/o ethanol mixture (360 mL ethanol/128 gm AIN mix ratio), and allowed to dry. The bottom surface was left unsprayed. About 15.2 g 6061™ aluminum alloy plates were placed in contact with the uncoated bottom surface of the part. The part was then placed in saffil beds and infiltrated in an AVS furnace under vacuum conditions at 1160° C., held for 2 hours, and cooled rapidly via a furnace water jacket. The resultant part has excess surface aluminum only on the base of the part where no non-wettable powder was placed.

EXAMPLE 2

A greenware part was prepared and molded as in Example 1. The part was then dipped in an ethanol and $Al_2O_3$ (non-wetting to aluminum) slurry mixture (20.6 v/o Alcoa A-16 Sg (super-ground), 79.4 v/o ethanol); the bottom surface was wiped clean to provide a surface from which to initiate infiltration and allowed to dry in air. The part was then placed in an alumina bed (Alcoa A-16 Sg) as a wicking aid during debindering. The following heating schedule was applied: 7° C./hr-100° C., 5° C./hr-310° C., 10° C./hr-375 20° C., 20° C./hr-410° C., 7° C./hr-500° C. cooled to room temperature in a nitrogen atmosphere. Following the debindering step, the coating layer remained adherent to the part surface, leaving the specimen in a condition directly ready for infiltration as described in Example 1.

What is claimed is:

1. A process for preparing a complex-shaped ceramic-metal composite article, comprising:
    a) contacting a non-wetting powder selected from the group consisting of a nitride, oxide, silicide and mixtures thereof with a porous shaped ceramic body, comprised of boron carbide, silicon carbide or mixtures thereof to provide a layer or layers on one or more surfaces of the porous shaped ceramic body and to provide at least one uncovered surface region where there is no layer of the non-wetting powder on the porous shaped ceramic body,
    b) placing the porous shaped body with the contacting non-wetting powder in a vacuum furnace and
    c) infiltrating in the vacuum furnace, under vacuum, the porous shaped ceramic body with a metal through one or more of the uncovered surface regions while maintaining the non-wetting powder layer on the one or more surfaces, such that the complex-shaped ceramic-metal composite is formed, wherein the composite has substantially the net shape of the porous shaped ceramic body and the surface of the composite fails to have the metal thereon, except at the uncovered surface regions.

2. The process of claim 1 wherein the metal is silicon, magnesium, aluminum, titanium, vanadium, chromium, iron, copper, nickel, cobalt, tantalum, tungsten, molybdenum, zirconium, niobium or combinations thereof.

3. The process of claim 1 wherein the metal is aluminum or alloy thereof.

4. The process of claim 1 wherein the non-wetting powder is aluminum nitride, aluminum oxide, boron nitride or mixtures thereof.

5. The process of claim 4 wherein the non-wetting powder is aluminum nitride.

6. The process of claim 1 wherein the ceramic of the shaped ceramic body is comprised of boron carbide.

7. The process of claim 1 wherein the metal is aluminum, the ceramic of the shaped ceramic body is boron carbide, the non-wetting powder is AlN and the surface of the composite fails to have aluminum carbide and $Al_4BC$ thereon, except at the regions where there is no layer of the non-wetting powder.

8. A process for preparing a complex-shaped ceramic-metal composite article, comprising:
    a) contacting a non-wetting powder selected from the group consisting of a nitride powder with a porous shaped ceramic body comprised of boron carbide, silicon carbide or mixtures thereof to provide a layer or layers, on one or more surfaces of the porous shaped ceramic body, and to provide at least one uncovered surface region where there is no layer on the porous shaped ceramic body and
    b) infiltrating the porous shaped ceramic body under a non-oxidizing gas or a vacuum having a pressure of 1 to 20 millitorrs with a metal through one or more of the uncovered surface regions, such that the complex-shaped ceramic-metal composite is formed, wherein the composite has substantially the net shape of the shaped ceramic body and the surface of the composite fails to have the metal thereon, except at the uncovered surface regions.

9. The process of claim 8 wherein the metal is silicon, magnesium, aluminum, titanium, vanadium, chromium, iron, copper, nickel, cobalt, tantalum, tungsten, molybdenum, zirconium, niobium or combinations thereof.

10. The process of claim 9 wherein the metal is aluminum or alloy thereof.

11. The process of claim 8 wherein the ceramic of the ceramic shaped body is comprised of boron carbide.

12. The process of claim 8 wherein the infiltrating step is performed under the non-oxidizing gas.

13. The process of claim 10 wherein the non-wetting powder is AlN and the surface of the composite fails to have aluminum carbide and $Al_4BC$ thereon, except at the regions where there is no layer of the non-wetting powder.

14. The process of claim 12 wherein the non-oxidizing gas is comprised of argon or nitrogen.

15. The process of claim 8 wherein the nitride powder is comprised of a powder selected from the group consisting of AlN, BN and mixtures thereof.

16. The process of claim 15 wherein the nitride powder is AlN.

17. A process for preparing a complex-shaped ceramic-metal composite article, comprising:
    a) contacting a non-wetting powder selected from the group consisting of a nitride, oxide, silicide and mixtures thereof with a porous shaped ceramic body comprised of boron carbide to provide a layer or layers on one or more surfaces of the porous shaped ceramic body and to provide at least one uncovered surface region where there is no layer on the porous shaped ceramic body,
    b) placing the porous shaped body with the contacting non-wetting powder in a vacuum furnace and
    c) infiltrating the porous shaped ceramic body under a vacuum in the vacuum furnace with a metal selected from the group consisting of aluminum and alloy thereof through one or more of the uncovered surface regions while maintaining the non-wetting powder layer on the one or more surfaces, such that the complex-shaped ceramic-metal composite is formed wherein the composite has substantially the net shape of the porous shaped ceramic body and the surface of the composite fails to have the metal, aluminum carbide and $Al_4BC$ thereon, except at the uncovered surface regions.

18. The process of claim 17 wherein the pressure of the vacuum is 1 to 20 millitorrs.

19. The process of claim 17 wherein the non-wetting powder is aluminum nitride, aluminum oxide, boron nitride or mixtures thereof.

* * * * *